US006971493B2

United States Patent
Yoshimoto

(10) Patent No.: US 6,971,493 B2
(45) Date of Patent: Dec. 6, 2005

(54) FRONT FORK

(75) Inventor: Tsutomu Yoshimoto, Tokyo (JP)

(73) Assignee: Kayaba Industry Co., Ltd., Tokyo (JP)

( * ) Notice: Subject to any disclaimer, the term of this patent is extended or adjusted under 35 U.S.C. 154(b) by 0 days.

(21) Appl. No.: 10/794,049

(22) Filed: Mar. 8, 2004

(65) Prior Publication Data
US 2004/0226790 A1 Nov. 18, 2004

(30) Foreign Application Priority Data
Mar. 27, 2003 (JP) ............................. 2003-086752

(51) Int. Cl.⁷ ............................................... F16F 9/16
(52) U.S. Cl. ...................... 188/312; 188/315; 280/276
(58) Field of Search ................ 188/312–318, 188/275–287; 280/275–287

(56) References Cited

U.S. PATENT DOCUMENTS

| 3,024,874 A | * | 3/1962 | De Koning et al. ........ 188/286 |
| 3,966,030 A | * | 6/1976 | Sirven ........................ 188/318 |
| 4,084,668 A | * | 4/1978 | Rybicki ...................... 188/312 |
| 4,262,779 A | * | 4/1981 | Katsumori et al. ......... 188/315 |
| 4,280,600 A | * | 7/1981 | Salmon et al. ............. 188/312 |
| 5,347,771 A | * | 9/1994 | Kobori et al. ............. 52/167.1 |
| 6,244,609 B1 | * | 6/2001 | Wilson ....................... 280/276 |

FOREIGN PATENT DOCUMENTS

JP 1-80842 5/1989

* cited by examiner

Primary Examiner—Chris Schwartz
(74) Attorney, Agent, or Firm—Rabin & Berdo, PC

(57) ABSTRACT

This invention provides a front fork that can be efficiently be filled with oil when it is manufactured. To achieve this object, the front fork comprising: an outer tube (1); an inner tube (2) inserted expansibly and contractibly into the outer tube (1); a double-rod damper (70) disposed inside the outer tube (1) and the inner tube (2), the double-rod damper (70) including an upper chamber (3a) and a lower chamber (3b) defined therein into which that oil is contained; and a fork-inside oil chamber (71) defined by the outer tube (1), the inner tube (2), and the double-rod damper (70), into which oil and air are contained, the front fork comprising: a check valve (24) disposed in a lower portion (3b) of the double-rod damper (70), the check valve (24) allowing only one-way flow of oil from the fork-inside oil chamber (71) to the lower chamber (3b) of the double-rod damper (70); and an air vent passage (25) of a small sectional area disposed in an upper portion of the double-rod damper (70), the air vent passage (25) communicating the upper chamber (3a) of the double-rod damper (70) with the fork-inside oil chamber (71).

5 Claims, 3 Drawing Sheets

FRONT FORK

CROSS-REFERENCE TO RELATED APPLICATIONS

The present application is related to U.S. application Ser. No. 10/799,587.

FIELD OF THE INVENTION

The present invention relates to a front fork housing a damper therein for a motor cycle. More specially, the present invention relates to a front fork having a double-rod damper.

BACKGROUND OF THE INVENTION

Japanese Unexamined Utility Model Publication No. hei 01-80842 published in 1989 by Japan Patent Office describes a front fork with a double-rod damper where piston rods extend from both sides of a piston.

SUMMARY OF THE INVENTION

However, in a front fork with a double-rod damper as the related art, the double-rod damper is disposed inside an outer tube and an inner tube framing the front fork. When oil is, on a manufacturing step of the front fork, supplied into the front fork with a piston incorporated inside the damper, the filling of the oil is not performed efficiently, to deteriorate a work performance thereof.

Accordingly an object of the present invention is, in view of the foregoing problem, to provide a front fork into an oil chamber in which oil can be efficiently filled.

This object of the present invention is basically attained by providing a front fork that comprises an outer tube; an inner tube inserted expansibly and contractibly into the outer tube; a double-rod damper disposed inside the outer tube and the inner tube, the double-rod damper including an upper chamber and a lower chamber defined therein into which oil is contained; and a fork-inside oil chamber defined by the outer tube, the inner tube, and the double-rod damper, into which oil and air are contained.

The front fork also comprises: a check valve disposed in a lower portion of the double-rod damper, the check valve allowing only one-way flow of oil from the fork-inside oil chamber to the lower chamber of the double-rod damper; and an air vent passage of a small sectional area disposed in an upper portion of the double-rod damper, the air vent passage communicating the upper chamber of the double-rod damper with the fork-inside oil chamber.

These and other objects, features, aspects and advantages of the present invention will become apparent to those skilled in the art from the following detailed description, which, taken in conjunction with the annexed drawings, discloses preferred embodiments of the present invention.

EXPLANATION OF THE PREFERRED EMBODIMENTS OF THE INVENTION

Figure 1:
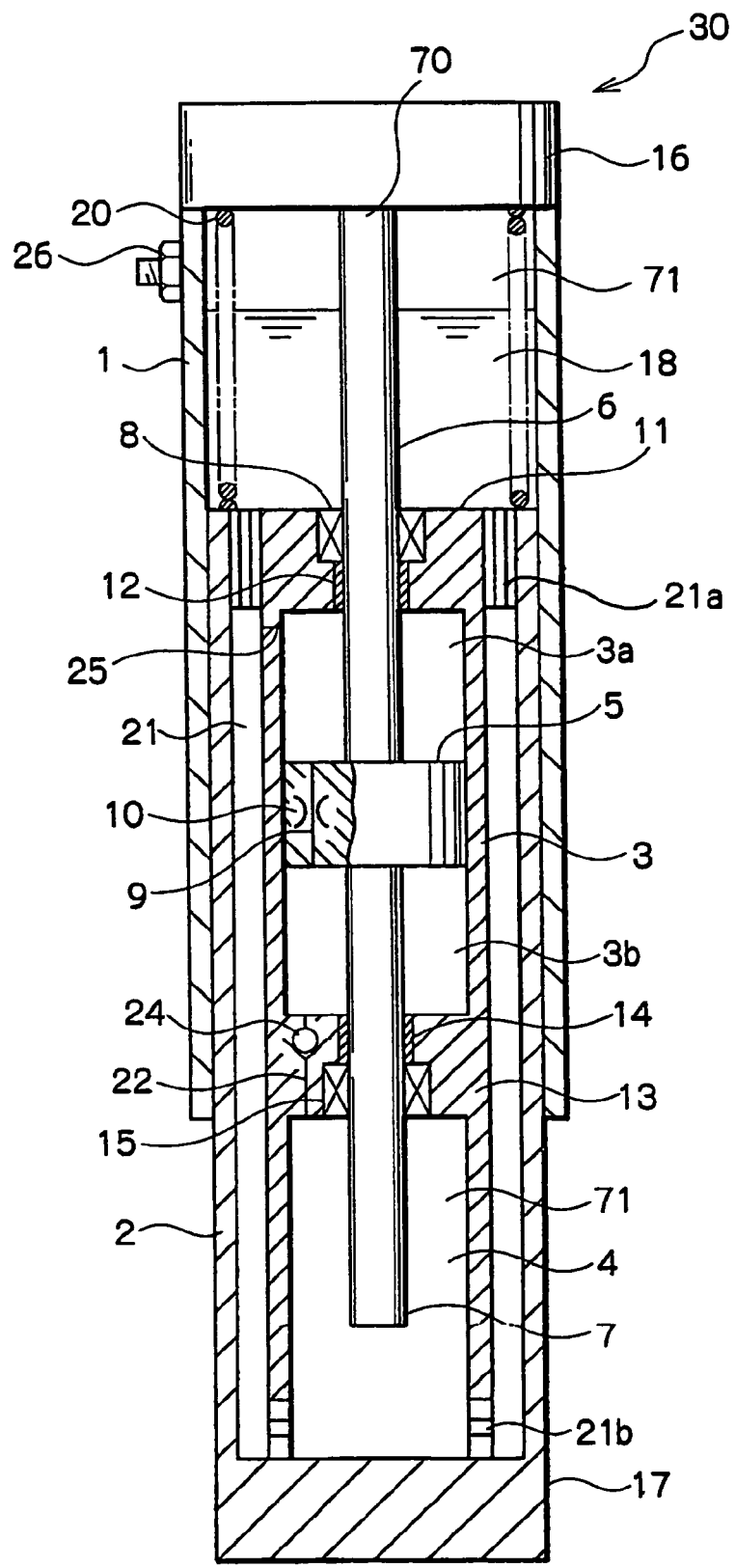
FIG. 1 is a sectional view of a front fork of a first embodiment according to the present invention.

FIG. 1 is a sectional view of a front fork 30 for a motor cycle of a first embodiment according to the present invention.

The front fork 30 is formed of a cylindrical outer tube 1 connected to a vehicle body (not shown), a cylindrical inner tube 2 connected to a wheel (not shown) and placed inside the outer tube 1 as engaged slidably therewith, and a double-rod damper 70 arranged inside the outer tube 1 and the inner tube 2.

A cylinder 3 is disposed coaxial with the inner tube 2 inside thereof and a piston 5 is sidably disposed inside the cylinder 3, to form the double-rod damper 70. The piston 5 divides an inside of the cylinder 3 into an upper chamber 3a and a lower chamber 3b, and has a first passage 9 therein to communicate between the upper chamber 3a and the lower chamber 3b. A damping valve 10 is disposed in the first passage 9, to control a flow amount of oil traveling through the first passage 9.

For example, when the piston 5 moves upward and downward inside the cylinder 3 due to vibrations transmitted from a wheel, the vibrations are damped by resistance that the damping valve 10 gives to the oil traveling through the first passage 9.

A first rod 6 extends from an upper face of the piston 5 and penetrates through an upper end wall 11 of the cylinder 3 and a first chamber 18 defined by a lid portion 16 of the outer tube 1 and the upper end wall 11 of the cylinder 3, and then a tip of the first rod 6 is connected to the lid portion 16 of the outer tube 1. A second rod 7 extends from a lower face of the piston 5 and penetrates through a lower end wall 13 of the cylinder 3 and then a tip of the second rod 7 reaches an inside of a second chamber 4 defined by a bottom 17 of the inner tube 2 and the cylinder 3. Herein the first chamber 18 and the second chamber 4 form a fork-inside oil chamber 71 described later.

A bearing 12 is disposed in the upper end wall 11 of the cylinder 3 and slidably supports the first rod 6. The bearing 12 is made of a metal material such as a white metal. A seal member 8 is disposed in the upper wall 11 to be in series with the bearing 12 in an axial direction so that the oil in the upper chamber 3a of the cylinder 3 does not leak from a clearance between the first rod 6 and the bearing 12.

A bearing 14 is disposed in the lower end wall 13 of the cylinder 3 and slidably supports the second rod 7. The bearing 14 is made of a metal material such as a white metal. A seal member 15 disposed in the lower end wall 13 to be in series with the bearing 14 in an axial direction so that the oil in the lower chamber 3b of the cylinder 3 does not leak from a clearance between the second rod 7 and the bearing 14.

The fork-inside oil chamber 71 is defined inside the front fork 30 by the outer tube 1, the inner tube 2, and the cylinder 3 where the fork-inside oil chamber 71 is a closed space the volume of which varies with expansion and contraction of the front fork 30. The first chamber 18 and the second chamber 4 forming the fork-inside oil chamber 71 as described above are communicated with each other through a second passage 21 defined between the inner tube 2 and the cylinder 3, an upper aperture 21a, and a lower aperture 21b.

Oil and air are contained in the fork-inside oil chamber 71 where the volume therein varying with expansion and contraction of the front fork 30 is absorbed by variations of air capacity. When the front fork 30 is contracted, the air contained inside the fork-inside oil chamber 71 is compressed in accordance with a stroke amount of the front fork 30, and functions as an air spring.

A suspension spring 20 that bears a load acting on the front fork 30 is disposed between the upper end wall 11 of the cylinder 3 and the lid portion 16 of the outer tube 1.

By constituting the double-rod damper 70 as described above, the double-rod damper 70 can be expanded and contracted without containing the air into the cylinder 3 housing the piston 5. Accordingly it is prevented that the air enclosed is mixed into the oil inside the cylinder 3, and as a result a characteristic of the oil changes, to bring about a change of the damping characteristic of the piston.

In the embodiment, in order to efficiently contain oil into the damper 70 with the piston 5 being incorporated inside the cylinder 3 at a manufacturing step of the front fork 30, a third passage 22 is formed in the lower end wall 13 of the cylinder 3 so that the third passage 22 supplies oil from the second chamber 4 into the lower chamber 3b of the cylinder 3. A check valve 24 is disposed in the third passage 22, to allow only inflow of oil from the second chamber 4 into the lower chamber 3b of the cylinder 3 and to prevent the flow of the oil from the lower chamber 3b into the second chamber 4. And an air vent passage 25 of a small passage-sectional area is disposed in the cylinder 3 in the vicinity of the upper end wall 11 thereof, to communicate between an inside (the upper chamber 3a) of the cylinder 3 and the second passage 21.

Figure 2:
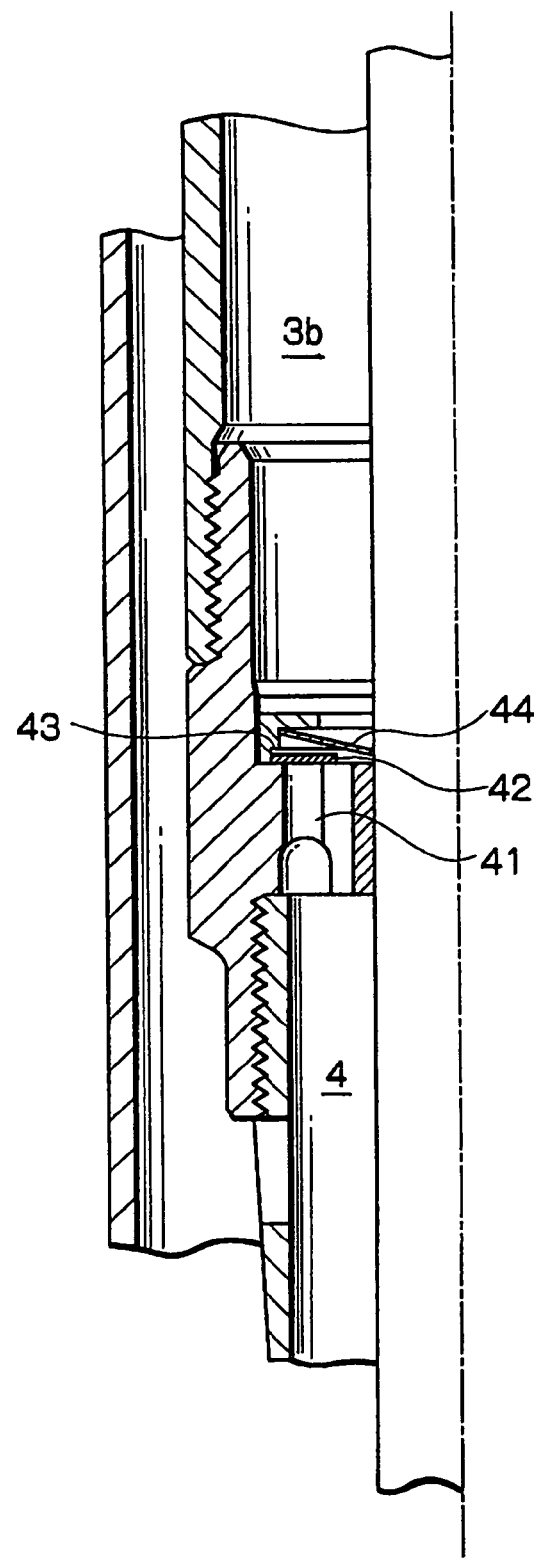
FIG. 2 is a sectional view of a check valve of the first embodiment according to the present invention.

FIG. 2 is a detailed sectional view of the above-described check valve 24.

The check valve 24 is formed of a leaf valve, which is constructed such that a flat member 42 is biased by a leaf spring 44 disposed inside a valve housing 43, to close a port 41. When an oil pressure in the second chamber 4 is increased more than an oil pressure in the lower chamber 3b, the oil pressure in the second chamber 4 lifts up the flat member 42, so that the oil passes through the port 41. When the oil pressure in the second chamber 4 is lower than the oil pressure in the lower chamber 3b, the flat member 42 closes the port 41, to prevent reverse flow of the oil to the second chamber 4.

Next a filling method of oil into the front fork 30 of the embodiment will be explained.

A predetermined amount of oil is supplied to the first chamber 18 from an oil inlet 26 disposed in an upper portion of the first chamber 18 and then the oil inlet 26 is tightly closed. In this condition the air is contained in the upper chamber 3a and the lower chamber 3b of the cylinder 3, and therefore, these chambers 3a, 3b inside the cylinder 3 are not filled with the oil.

The front fork 30 is attached to a tool (not shown) and is forcedly contracted by the tool. As a result the piston 5 moves toward a lower side inside the cylinder 3, and the volume in the lower chamber 3b is reduced, to compress the contained air in the lower chamber 3b. On the other hand, on this occasion the volume in the upper chamber 3a expands and pressure inside the upper chamber 3a becomes negative. Accordingly the air in the compressed lower chamber 3b travels through the first passage 9 of the piston 5 into the upper chamber 3a.

Next the front fork 30 is forcedly expanded. The piston 5 moves toward an upper side inside the cylinder 3, and the volume in the lower chamber 3b expands and the pressure inside the lower chamber 3b is reduced. As a result the check valve 24 in the third passage 22 is opened, causing the oil to flow from the second chamber 4 into the lower chamber 3b. On the other hand, on this occasion the volume in the upper chamber 3a is reduced and the air in the upper chamber 3a is compressed, causing a part of the compressed air to be discharged through the air vent passage 25 to the second passage 21. The discharged air in the second passage 21 travels through the upper aperture 21a to the upper side of the first chamber 18 due to the buoyant force of the air.

In such a way, pumping of the front fork 30 continues to be performed, the air inside the lower chamber 3b is discharged into the upper chamber 3a and the lower chamber 3b is filled with the oil that flows from the second chamber 4. As the lower chamber 3b becomes filled with the oil, the oil from the lower chamber 3b flows through the first passage 9 into the upper chamber 3a and fills the upper chamber 3a.

By thus filling the oil, the air is easily and completely discharged from both the upper chamber 3a and the lower chamber 3b of the cylinder 3 and each chamber 3a, 3b can be certainly filled with the oil.

And by disposing the air vent passage 25 in the cylinder 3, even if the oil inside the cylinder 3 expands due to temperature rise of the oil, the expanded oil escapes through the air vent passage 25 to the first chamber 18. And even if the oil in the cylinder 3 is contracted due to temperature decrease of the oil, the oil in the first chamber 18 and the second chamber 4 is pulled in through the air vent passage 25 and the check valve 24 into the cylinder 3. Therefore, the pressure inside the cylinder 3 can be always held constant. As a result it is not required to dispose an accumulator in a piston like a conventional art, and a manufacturing cost for a front fork can be reduced by decreasing the number of components.

Figure 3:
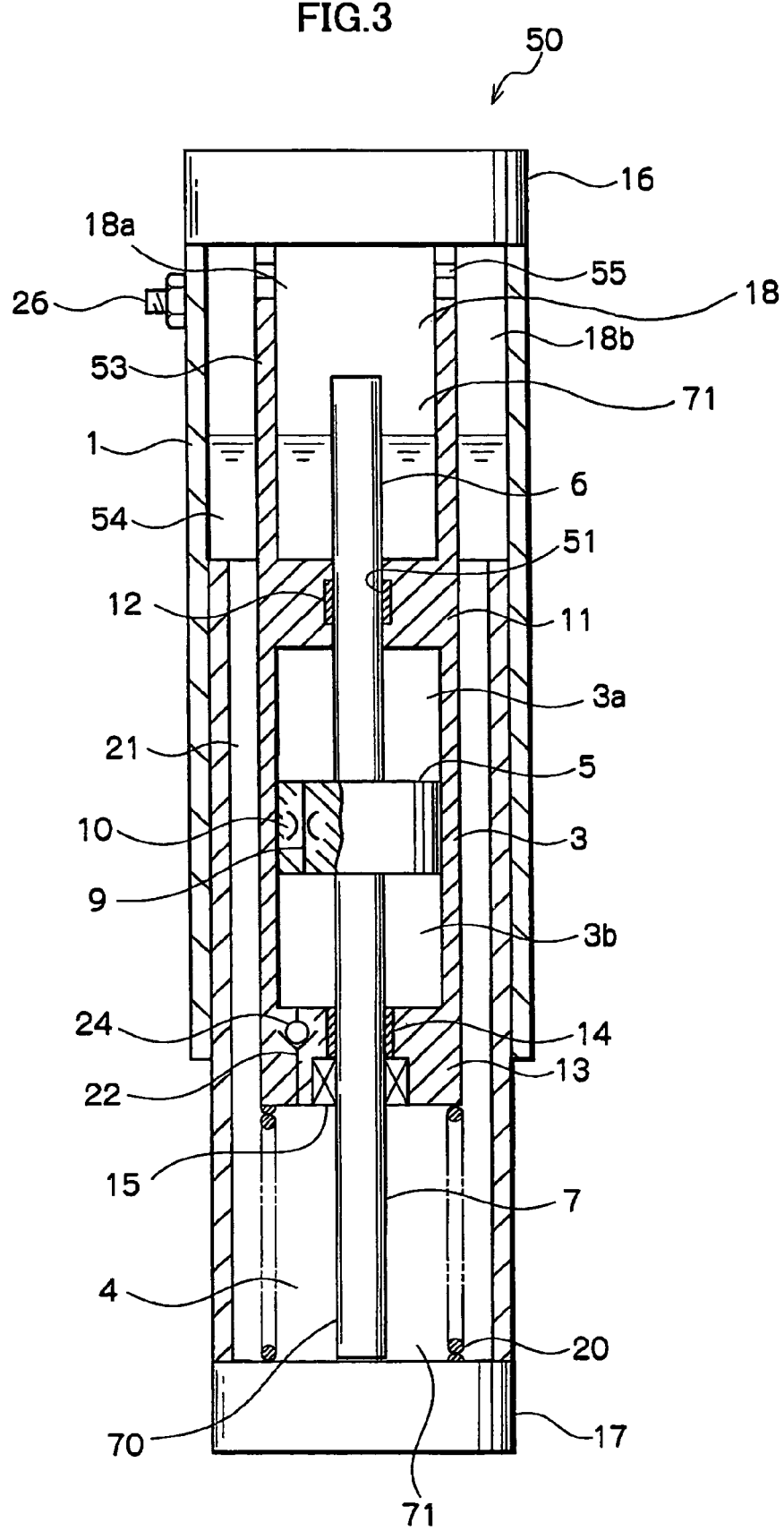
FIG. 3 is a sectional view of a front fork of a second embodiment according to the present invention.

FIG. 3 is a sectional view of a front fork 50 for a motor cycle of a second embodiment according to the present invention.

In the second embodiment the cylinder 3 is formed coaxial with the outer tube 1 inside thereof, which is spaced by a predetermined clearance 54 in the radial direction from the outer tube 1, to define a double-cylindrical first chamber 18 (18a, 18b), an inner first chamber 18a defined inside the cylinder 3, and an outer first chamber 18b defined between the cylinder 3 and the outer tube 1. A cylindrical leg 53 extends from the upper end wall 11 of the cylinder 3 to the lid portion 16 of the outer tube 1 and connected thereto. A communicating aperture 55 is disposed in the cylindrical leg 53 close to the lid portion 16 of the outer tube 1, and the inner first chamber 18a and the outer first chamber 18b are communicated through the communicating aperture 55.

The suspension ring 20 that bears a load acting on the front fork 30 is received in the second chamber 4 positioned below the cylinder 3.

The first rod 6 is not connected to the lid portion 16 of the outer tube 1 and the tip of the first rod 16 extends to the middle of the inner first chamber 18a. The second rod 7 is connected to the bottom 17 of the inner tube 2.

Only the bearing 12 that supports the first rod 6 is disposed in the upper end wall 11 of the cylinder 3 and the seal member 8 as formed in the first embodiment is not present. Thus the seal member 8 is not disposed in the upper end wall 11, causing a slight clearance 51 between the first rod 6 and the bearing 12. As a result, the air vent passage 25 formed in the first embodiment is not disposed herein.

Components of the second embodiment other than the above-described are identical to those in the first embodiment and are referred to as the same numerals with the first embodiment.

In the process of filling oil, the clearance 51 performs a role of the air vent passage 25 explained in the first embodiment. Namely when filling an inside of the cylinder 3 with the oil by the pumping of the front fork 50 as explained in the first embodiment, an air compressed inside the upper chamber 3*a* of the cylinder 3 is discharged through the clearance 51 into the inner first chamber 18*a*.

Thus according to the above-described construction it is also easy that the air is completely discharged from the upper chamber 3*a* and the lower chamber 3*b* of the cylinder 3 and the oil can be certainly filled inside the cylinder 3.

And even if the oil inside the cylinder 3 is expanded due to temperature variations, since the expanded oil is escaped from the clearance 51 formed between the bearing 12 and the first rod 6 to the first chamber 18*a*, the pressure in the cylinder 3 can be always kept constant. As a result, the embodiment does not require an accumulator like a conventional art and reduces the number of the components used, causing reduction of a manufacturing cost for a front fork.

Further, since formation of the air vent passage 25 is not required, the number of manufacturing steps for the double-rod front fork 50 can be reduced, causing reduction of a manufacturing cost therefor.

The embodiments are, as described above, explained with specific words to some extent with regard to features of the structures and methods thereof, but these means disclosed in this specification cover the preferred embodiments for carrying out the present invention and it is understood that the present invention is not limited to the specific features illustrated and described herein. Accordingly the present invention includes any modes and alternations within the scope described in the claims that be properly construed based upon the principle of equivalency.

What is claimed is:

1. A front fork, comprising:
    an outer tube;
    an inner tube inserted expansibly and contractibly into the outer tube;
    a double-rod damper disposed inside the outer tube and the inner tube, the double-rod damper including:
        a cylinder,
        a piston received in the cylinder, the piston defining an upper chamber and a lower chamber in which that oil is contained, the upper chamber being on one side of the piston, and the lower chamber being on another side of the piston,
        a first rod connected to one face of the piston and extending through the upper chamber, and
        a second rod connected to another face of the piston and extending through the lower chamber;
    a fork-inside oil chamber defined by the outer tube, the inner tube, and the double-rod damper, in which oil and air are contained, both the first rod and the second rod penetrating through the cylinder;
    a check valve disposed in a passage connecting the lower chamber of the double-rod damper with the fork-inside oil chamber, the check valve allowing only one-way flow of oil from the fork-inside oil chamber to the lower chamber of the double-rod damper; and
    an air vent passage of a small sectional area disposed in an upper portion of the double-rod damper, the air vent passage connecting the upper chamber of the double-rod damper with the fork-inside oil chamber.

2. A front fork as defined in claim 1, wherein the fork-inside oil chamber includes a first chamber defined by the outer tube and the cylinder, and a second chamber defined by the inner tube and the cylinder, and the check valve allows the only one-way flow of oil from the second chamber of the fork-inside oil chamber to the lower chamber of the double-rod damper.

3. A front fork as defined in claim 2, wherein the double-rod damper further includes a bearing disposed in the cylinder, to slidably support the first rod, and the air vent passage is formed of a clearance between the first rod and the bearing, to connect the upper chamber of the double-rod damper with the first chamber of the fork-inside oil chamber.

4. A front fork as defined in claim 1, wherein the fork-inside oil chamber includes a first chamber defined by the outer tube and the cylinder, and a second chamber defined by the inner tube and the cylinder, and the air vent passage connects the upper chamber of the double-rod damper with the first chamber of the fork-inside oil chamber.

5. A front fork as defined in claim 4, wherein the fork-inside oil chamber further comprises a passage connecting the first chamber and the second chamber, and the air vent passage connects the upper chamber of the double-rod damper with the first chamber of the fork-inside oil chamber via the passage.

* * * * *